United States Patent
Lavallee et al.

(10) Patent No.: US 7,934,018 B1
(45) Date of Patent: Apr. 26, 2011

(54) METHODS AND APPARATUS FOR SYNCHRONIZING CONFIGURATION DATA

(75) Inventors: James E. Lavallee, Boylston, MA (US); Alexander Dubrovsky, Westborough, MA (US); Francois Gauvin, Salem, MA (US)

(73) Assignee: EMC Corporation, Hopkinton, MA (US)

( * ) Notice: Subject to any disclaimer, the term of this patent is extended or adjusted under 35 U.S.C. 154(b) by 1960 days.

(21) Appl. No.: 10/954,992

(22) Filed: Sep. 30, 2004

(51) Int. Cl.
*G06F 15/16* (2006.01)
*G06F 15/173* (2006.01)

(52) U.S. Cl. ......... 709/248; 709/218; 709/229; 709/238
(58) Field of Classification Search .................. 707/201; 709/248, 218, 229, 238
See application file for complete search history.

(56) References Cited

U.S. PATENT DOCUMENTS

| | | | |
|---|---|---|---|
| 6,449,622 B1* | 9/2002 | LaRue et al. .................. | 707/201 |
| 7,058,715 B2* | 6/2006 | Jain et al. ...................... | 709/225 |
| 7,213,038 B2* | 5/2007 | Midgley ........................ | 707/201 |
| 7,213,039 B2* | 5/2007 | Ramanujam et al. ......... | 707/203 |
| 7,318,110 B2* | 1/2008 | Yumoto et al. ................ | 709/248 |
| 7,346,616 B2* | 3/2008 | Ramanujam et al. ............ | 707/8 |
| 2003/0204557 A1* | 10/2003 | Mandal et al. ................ | 709/202 |
| 2003/0220966 A1* | 11/2003 | Hepper et al. ................. | 709/203 |
| 2004/0139178 A1* | 7/2004 | Mendez et al. ................ | 709/220 |
| 2006/0080468 A1* | 4/2006 | Vadlamani et al. ........... | 709/250 |

* cited by examiner

*Primary Examiner* — Phuoc Nguyen
*Assistant Examiner* — Anish Sikri
(74) *Attorney, Agent, or Firm* — Krishnendu Gupta; Gerald P. Kazanjian

(57) ABSTRACT

An agent in a storage area network stores a first identifier (e.g., a checksum value) for first zone configuration data previously used to configure a zone in the storage area network. The agent derives the first identifier from contents of the first zone configuration data. Further, the agent retrieves second zone configuration data presently used to configure the zone in the storage area network. The second zone configuration data is potentially different than the first zone configuration data. Based on contents of the second zone configuration data, the agent then produces a second identifier for the second zone configuration data. The agent then compares the first identifier and the second identifier to identify whether the first zone configuration data is different than the second zone configuration data. A user can control behavior of zoning importation and activation depending whether current zone configuration data has been changed.

22 Claims, 10 Drawing Sheets

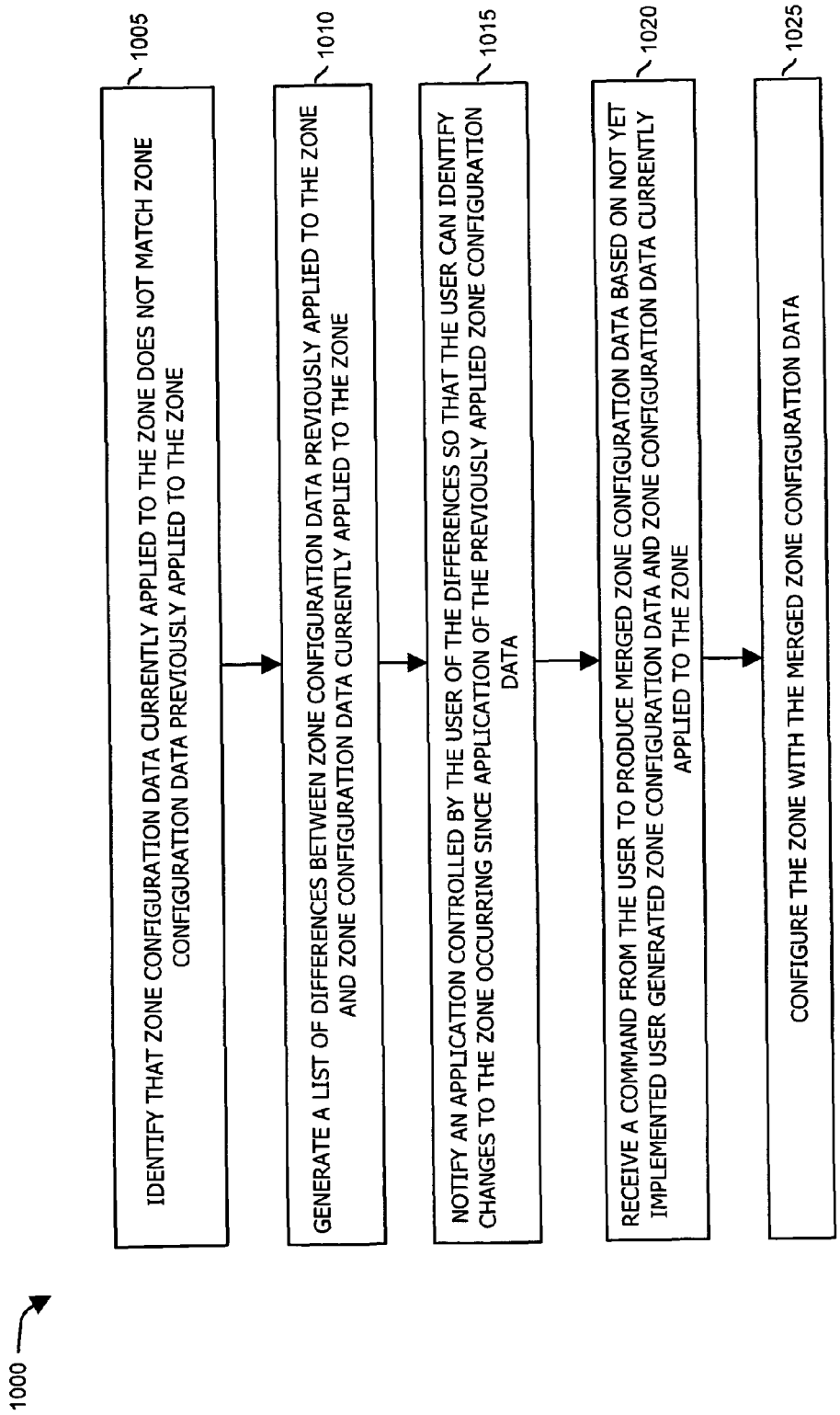

METHODS AND APPARATUS FOR SYNCHRONIZING CONFIGURATION DATA

BACKGROUND

The rapid expansion of information service and data processing industries has resulted in a need for computer systems to manage and store large amounts of data. As an example, financial service companies such as banks, mutual fund companies or the like often operate complex data processing systems that require access to many hundreds of gigabytes or even terabytes of data and files stored within high capacity data storage systems. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems (e.g., many host computers) that operate as servers to access data stored in the data storage systems (e.g., via a complex switched-network) on behalf of client computers that request data from the servers. Typically, storage area networks support hi-speed acquisitions of data so that the host servers are able to promptly retrieve and store data from the data storage system.

Conventional storage area network management applications typically include corresponding conventional graphical user interfaces (GUIs) that enable network managers to graphically manage, control and configure various types of hardware and software resources associated with a corresponding managed storage area network. For example, one conventional network management storage application generates a graphical user interface utilized by a network manager to graphically select, interact with, and manage local or remote devices and software processes associated with the storage area network. More specifically, based on use of the graphical user interface in combination with an input device such as a hand operated mouse and corresponding pointer displayed on a viewing screen, a network manager is able to manage hardware and software entities such as file systems, databases, storage devices, peripherals, network data communications devices, etc., associated with the storage area network. In some storage area networks, a conventional network management station and associated management software allows a network administrator or systems manager (a person responsible for managing the storage network) to establish "zones" of related resources within the storage network.

Generally, a zone of resources within a storage network is an association, relation or grouping of resources (e.g., servers, switch channels, portions of data storage) that are arranged according to function or location. By way of example, a network administrator can use conventional vendor-supplied (i.e., manufacturer supplied) storage network management software to configure a zone of ports (data communications channels or paths) within that vendor's data switch to associate selected servers in the data storage network with selected data storage resources in the storage area network. Thus, the network administrator might, for example, define a zone to include a server or group of servers, a dedicated channel through the data switch (via allocation of one or more ports), and an amount of data storage space in the form of one or more volumes of storage maintained within one or more of the data storage systems. An administrator might create many zones in the storage network, for example, for each department (e.g., engineering, accounting, human resources, and the like) within a company.

A data switch (or one or more switches) that channels requests for data between the host resources (e.g., servers) and various data storage devices is generally responsible for zone enforcement. In operation of a typical data switch, each port within the data switch is dedicated to transferring data to and/or from a single respective data storage system or server computer system.

To create a zone, a network manager utilizes vendor zone management software to establish a grouping of one or more server ports (i.e., connections between the data switch and a server) with one or more data storage system ports (i.e., connections between the data switch and a data storage system) together into a zone. Generally, resources (servers, switch ports, and portions of data storage systems) within the same zone can "see" or access each other, while resources in different zones cannot access each other. As an example, a server in a first zone can access data storage in the first zone, but not data storage allocated to other zones. Thus, as discussed, zoning in the context of storage networks operates as a form of access control and provides an organized mechanism of managing and associating amounts of data storage to specific computer systems.

To create or modify a given zone of a storage area network, a network manager provides zone configuration data to a switch resource indicating how to configure respective zones in the switch. Certain conventional applications do not limit the number of remote network managers that are able to modify the zones in the storage area network from different remote locations. Thus, two or more users may modify the same zone or zones of the storage area network.

SUMMARY

Conventional network management applications that support management of network resources such as zones suffer from a variety of deficiencies. For example, as discussed, conventional zone manager applications enable multiple users at different remote locations to modify existing zones in the storage area network. However, conventional zone manager applications do not always, if at all, take into account modifications by another party modifying the same zone.

For example, a first network manager may extract current configuration settings of a given zone in the storage area network. The first network manager may modify the current configuration settings of the given zone by applying a modified version of the extracted current configuration settings to the given zone. In the meantime, a second network manager may have extracted the same current configuration settings for the zone and attempt to modify the same zone. Without an accounting for the first network manager's changes to the given zone, the second network manager may overwrite configuration settings applied by the first network manager. Thus, network managers must be mindful that other network managers may overwrite their changes and that applied zone changes may be lost at any time when there are two or more network manager competing to change the configuration settings of the same zone.

Embodiments of the invention significantly overcome the aforementioned and other deficiencies of conventional network management applications. In particular, embodiments of the invention include mechanisms and techniques for managing zone configuration in such a way as to reduce, if not eliminate, the likelihood that one network manager of a storage area network unknowingly (or without warning) overwrites zone configuration changes previously applied to a zone by another network manager. Note that, in one embodiment, use of the term "zone" in this application is equivalent to the term "zone set." A zone set may include a collection of one or more zones. Thus, a user can activate a zone set and not just a single zone.

More specifically, an embodiment of the invention includes a technique of synchronizing zone configuration data used to configure a zone (a.k.a., zone set) of a storage area network. Multiple sources can configure the zone without notification to others. A user initially takes a snapshot of configuration data applied to configure the zone. The user proceeds to modify a copy of the snapshot of configuration data for the purpose of eventually activating (or applying) the copy and changing a configuration of the zone. "Activating" or "applying" the copy means utilizing the modified zone configuration data to configure the zone or zone set. In the meantime, a source other than the user may have modified the configuration data as well as configuration of the zone. Thus, there may be mismatch between the snapshot of configuration data initially taken by the user and present configuration data used to configure the zone.

When a user requests to activate the modified snapshot of zone configuration data, an agent in the storage area network checks whether the zone configuration data currently used to configure the zone is the same as the previously taken snapshot of zone configuration data utilized by the user. For example, the agent initially stores a checksum value (e.g., a unique identifier or quasi-unique identifier) based on the snapshot of configuration data. Upon request by the user to change the configuration of the zone via use of the user-modified snapshot of configuration data, the agent retrieves zone configuration data currently used to configure the zone and produces a corresponding checksum. This newly generated checksum associated with the currently applied zone configuration data is compared to the previously generated and stored checksum associated with the previously applied snapshot of zone configuration data. If the checksum values match, the agent notifies the user that there has been no configuration change to the zone since taking the snapshot (e.g., storing the previously applied zone data). In one embodiment, however, the agent does not notify the user.

In another embodiment, if the checksum values match it is safe to apply the changes, and the agent applies the modified configuration. If the checksum values do not match, the agent notifies the user that there has been a configuration change to the zone since taking the snapshot. The agent then presents the user with options enabling the user to overwrite the currently applied zone configuration settings with the user generated modifications or update the user's database with configuration settings currently applied to the zone. In one embodiment, the options selected by the user are forwarded to the agent for implementing. Thus, the agent facilitates synchronization of zone configuration data in the storage area network.

Now, more generally, embodiments of the invention therefore include a technique of utilizing an agent (e.g., a software process run on a processing device such as a storage area network resource) to detect when changes have been made to zone configuration data previously used to configure a zone in a storage area network. In one embodiment, the agent stores a first identifier (e.g., a checksum value) for first zone configuration data previously used to configure a zone in the storage area network. The agent derives the first identifier from contents of the first zone configuration data (e.g., a last seen zoning configuration). Further, the agent retrieves second zone configuration data (e.g., current zoning configuration) presently used to configure the zone in the storage area network. As discussed, the second zone configuration data is potentially different than the first zone configuration data previously used to configure the zone. Based on contents of the second zone configuration data, the agent then produces a second identifier for the second zone configuration data. The agent then compares the first identifier and the second identifier to identify whether the first zone configuration data (e.g., the previously applied zone configuration data) is different than the (e.g., currently applied zone configuration data) second zone configuration data. If the first identifier and second identifier match, the agent notifies the user that there has been no configuration change to the zone since applying the first zone configuration data to the zone. If the identifiers do not match, the agent notifies the user that there has been a configuration change to the zone since applying the first zone configuration data to the zone. In one embodiment, if the identifiers do not match, the agent applies the new zoning configuration.

In further embodiments, the agent then presents the user with options enabling the user to i) overwrite the currently applied zone configuration settings with the user generated modifications or ii) update the user's database with configuration settings currently applied to the zone. Options of merging are discussed later in this specification.

Accordingly, one embodiment of the invention includes implementation of an agent that receives a command from a user (e.g., a remotely located user) attempting modification of a current configuration of a zone. Based on the command, the user attempts to activate the zone with configuration data that is a modified version of zone configuration data previously used to configure the zone. The agent then identifies that the zone configuration data previously used to configure the zone is no longer used to configure the zone. In response to this condition, the agent notifies the user that the zone configuration data previously used to configure the zone is no longer used to configure the zone.

In further embodiments, the agent receives a command from the user to forward zone configuration data currently used to configure the zone to an application controlled by the user. The agent forwards the currently used zone configuration data to synchronize the user application with a source that modified configuration settings of the zone via use of the currently used zone configuration data. Consequently, the agent facilitates importing zone configuration data to the user application so that the user is synchronized with respect to the current configuration of the zone.

In yet further embodiments, the agent receives a command from the user to configure the zone via use of zone configuration data produced by the user, the user produced zone configuration data being generated based on user modifications to a copy of zone configuration data previously used to configure the zone. Based on receipt of the command, the agent applies the user produced zone configuration data to configure the zone even though the zone is no longer configured according to the previously applied zone configuration data. Consequently, in one embodiment, the agent facilitates exporting zone configuration data from the user to the switch so that the user is synchronized with respect to the current configuration of the zone.

In a still further embodiment, the agent prompts a user with an option of aborting application of user modified zone configuration data to the zone. Thus, user selected options can include importing zone data from, exporting zone data to, and aborting an operation of exporting zone data to a switch resource in a storage area network.

Further embodiments of the invention support generation of alerts (such as from the agent discussed above) to notify a user of a change to the configuration of a zone. For example, based on the above embodiment, an agent identifies a change to previously applied zone configuration data. The agent then notifies a zone configuration manager process (such as that utilized by the user) that a corresponding configuration of the zone has been modified since application of first zone configuration data previously used to configure the zone. The zone configuration manager process associated with the user, in turn, provides an alert message (to the user attempting to modify the zone) that the zone has already been modified since application of the first zone configuration data by an independent process other than that initiated by the user. Thus, the user is not aware of applied changes. The agent then updates the zone configuration manager process with current zone configuration data presently used to configure the zone such that the zone configuration manager process associated with the user is synchronized with zone configuration data currently used to configure the zone. The agent then provides an alert message to the user to indicate the occurrence of the update. For example, the user application displays the alert message to notify the user of the condition. Consequently, an agent in the storage area network can monitor zone configuration data for changes and notify a user when other sources modify zone configurations of the storage area network.

Other embodiments of the invention are directed towards identifying differences between previously applied zone configuration data to the zone and currently applied zone configuration data to the zone. For example, when the agent (or other employed process) identifies that zone configuration data currently applied to the zone does not match zone configuration data previously applied to the zone, the agent generates a list of differences between zone configuration data previously applied to the zone and zone configuration data currently applied to the zone. The agent then notifies an application controlled by the user of the differences so that the user can identify changes to the zone occurring since application of the previously applied zone configuration data. Thus, the user application can update its database based on the differences so that the user application has a copy of the presently applied zone configuration data used to configure a zone.

Yet other embodiments of the invention are directed towards merging zone configuration data submitted by a user with zone configuration data currently used to configure a zone. For example, when the agent (or other employed process) identifies that zone configuration data currently applied to the zone does not match zone configuration data previously applied to the zone, the user can direct the agent to merge the user generated zone configuration data with presently applied zone configuration data of a respective zone. For example, the agent can receive a command from the user to produce merged zone configuration data based on not yet implemented user generated zone configuration data and zone configuration data currently applied to the zone. Based on receipt of the command, the agent then identifies whether there are differences between previously applied zone configuration data to the zone and currently applied zone configuration data to the zone. If not, the agent can simply apply the new user generated zone configuration data to configure the zone. If there is a change between previously applied zone configuration data to the zone and currently applied zone configuration data, the agent merges the user generated zone configuration data with zone configuration data currently applied to the zone. In one embodiment, the agent first identifies whether the user generated zone configuration data and currently applied zone configuration data are "mergeable" based on a set of merge rules before applying the merged set of zone configuration data.

As discussed, techniques of the invention are well suited for use in applications in which multiple network managers modify configuration settings of the same zone in a storage area network. However, it should be noted that embodiments of the invention are not limited to use in such applications and thus embodiments of the invention are well suited for other applications as well. For example, techniques described herein can be used to synchronize other types of remotely located data.

Other embodiments of the invention include a computerized device (e.g., a host computer, workstation, etc.) configured to support the aforementioned method operations disclosed herein as embodiments of the invention to update zone configuration settings. In such embodiments, the computerized device includes a display, a memory system, a processor (e.g., a processing device) and an interconnect. The interconnect supports communications among the display, the processor and the memory system. The memory system is encoded with a resource management application that, when executed on the processor, produces a resource management process that includes a graphical user interface produced on the display of the computerized device. The graphical user interface allows the resource management process to perform any of the method embodiments and operations explained herein. For example, the resource management process generates a pop-up window affording a user the option of importing current zone configuration data used to configure a zone or overwrite the zone with user modifications regardless of current zone configuration settings.

Yet other embodiments of the invention disclosed herein include software programs to perform the method embodiment and operations summarized above and disclosed in detail below under the heading Detailed Description of Preferred Embodiments. More particularly, a computer program product (e.g., a computer-readable medium) including computer program logic encoded thereon may be executed on a computerized device to support synchronization of zone configuration data as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention.

One more particular embodiment of the invention is directed to a computer program product that includes a computer readable medium having instructions stored thereon for supporting management of network resources. The instructions, when carried out by a processor of a respective computer device, cause the processor to perform the steps of: i) storing a first identifier for first zone configuration data previously used to configure a zone in the storage area network, the first identifier derived from contents of the first zone configuration data, ii) retrieving second zone configuration data presently used to configure the zone in the storage area network, the second zone configuration data potentially being different than the first zone configuration data previously used to configure the zone, iii) producing a second identifier for the second zone configuration data, the second identifier being derived from contents of the second configuration data, and iv) comparing the first identifier and the second identifier to identify if the first zone configuration data is different than the second zone configuration data. Other embodiments of the invention include software programs to perform any of the method embodiment steps and operations summarized above and disclosed in detail below.

It should be understood that the system of the invention can be embodied as a software program or as a software program operating in conjunction with corresponding hardware. Example embodiments of the invention may be implemented within EMC's Control Center (ECC) software application that provides graphical management functionality for storage area network resources and in computerized devices that operate the Control Center (ECC) software. Control Center software is manufactured by EMC Corporation of Hopkinton, Mass., USA.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 10 is a flowchart illustrating a technique of notifying a user of changes to zone configuration settings as well as merging of zone configuration settings according to an embodiment of the invention.

DETAILED DESCRIPTION

An embodiment of the invention includes a technique of synchronizing zone configuration data used to configure a zone of a storage area network. Multiple sources can configure the zone without notification to others. A user initially takes a snapshot of configuration data applied to configure the zone. The user proceeds to modify a copy of the snapshot of configuration data for the purpose of eventually changing a configuration of the zone. In the meantime, a source other than the user may have modified the configuration data as well as configuration of the zone. Thus, there may be mismatch between the snapshot of configuration data initially taken by the user and present configuration data used to configure the zone.

When a user requests to activate the modified snapshot of zone configuration data, an agent in the storage area network checks whether the zone configuration data currently used to configure the zone is the same as the previously taken snapshot of zone configuration data utilized by the user. For example, the agent initially stores a checksum value (e.g., a unique identifier or quasi-unique identifier) based on the snapshot of configuration data. Upon request by the user to change the configuration of the zone via use of the user-modified snapshot of configuration data, the agent retrieves zone configuration data currently used to configure the zone and produces a corresponding checksum. This newly generated checksum associated with the currently applied zone configuration data is compared to the previously generated and stored checksum associated with the previously applied snapshot of zone configuration data. If the checksum values match, the agent notifies the user that there has been no configuration change to the zone since taking the snapshot. If the checksum values do not match, the agent notifies the user that there has been a configuration change to the zone since taking the snapshot. The agent then presents the user with options enabling the user to overwrite the currently applied zone configuration settings with the user generated modifications or update the user's database with configuration settings currently applied to the zone. Thus, the agent facilitates synchronization of zone configuration data in the storage area network.

Figure 1:
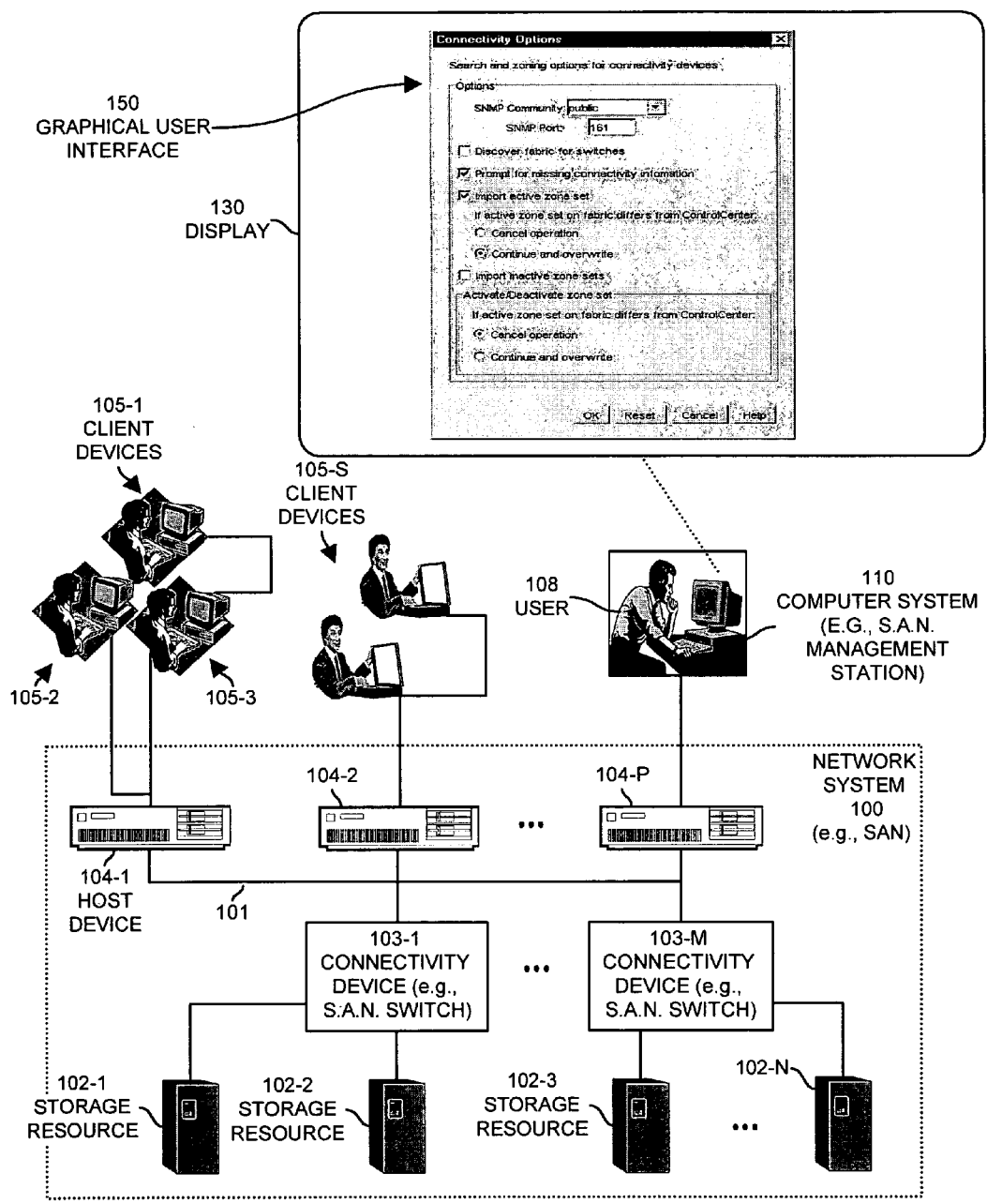
FIG. 1 is a block diagram of a storage area network and a management station configured to modify zones in the storage area network according to an embodiment of the invention.

FIG. 1 illustrates a network system 100 (e.g., a storage area network) suitable for use in explaining an operation of example embodiments of the invention. As shown, the network system 100 includes a network medium 101 such as a high-speed data communications medium (e.g., Ethernet, optical network, or other type of network) that interconnects a plurality of components such as storage resources 102-1, 102-2, . . . 102-N, network switches 103-1 (e.g., SAN switches), . . . , 103-M, host devices (e.g., host servers) 104-1, 104-2, . . . , 104-P, client devices 105-1, 105-2, . . . , 105-S, and computer system 110 (e.g., a storage area network management station).

Computer system 110 is configured, in this example, as a storage area network management station operated by a user 108 (e.g., a network manager responsible for managing the resources within the storage area network 100). Computer system 110 executes a resource manager application 120 (e.g., a software graphical user interface application more particularly shown in FIG. 2) that generates and displays information in accordance with embodiments of the invention as will be explained herein. The resource manager 120 in this example may be any type of network management software application that executes, performs or otherwise operates within computer 110 such as a computerized management station. It should be noted that computer system 110 may include certain other components such as one or more internal devices as well as software applications or processes that operate within or in conjunction with the illustrated components and devices in FIG. 1.

As shown towards the top of FIG. 1, the management station computer system 110 (e.g., a computer device) includes a corresponding display 130 (e.g., a monitor or other visual display device) which resource manager 120 controls to display a graphical user interface 150 as explained herein. In general, graphical user interface 150 presented by a software application (e.g., resource manager 120) running on the computer 110 enables user 108 to import zone configuration data from network 100 and export zone configuration data to network 100. User 108 provides input commands (e.g., selections by clicking on a mouse) to control information (e.g., tables, pop-up screens, etc.) displayed on display 130.

Figure 2:
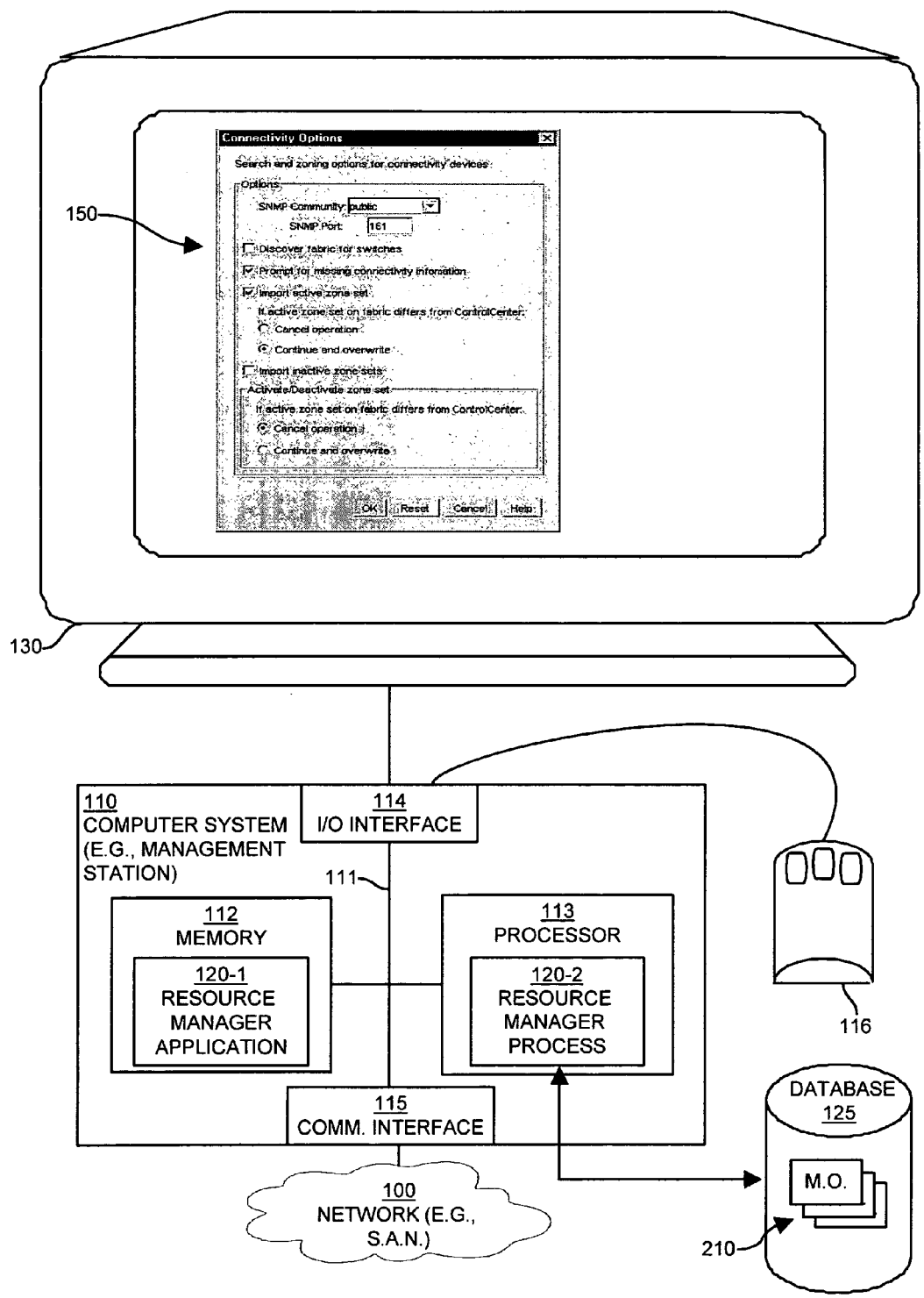
FIG. 2 is a block diagram of a processing device suitable for executing techniques according to an embodiment of the invention

FIG. 2 is a block diagram illustrating an example architecture of computer system 110 (e.g., a storage area network management station) according to embodiments of the invention. Computer system 110 may be a computerized device such as a personal computer, workstation, portable computing device, console, network terminal or the like. As shown, computer system 110 of the present example includes an interconnect 111 that couples a memory 112, a processor 113, an input/output interface 114 and a communications interface 115. Peripheral device 116 (e.g., one or more user controlled devices such as a keyboard, mouse, etc.) couples to processor 113 through I/O interface 114 and enables user 108 to provide input commands and thus generally control display management functions associated with graphical user interface 150.

Database 125 stores managed objects 210 and other data associated with managed entities (e.g., hardware and software entities associated with host devices 104, storage resources 102, connectivity devices 103, etc.) in network system 100. In alternative embodiments, database 125 can be any type of storage device that stores data.

Communications interface 115 of computer 110 enables computer system 110 (and corresponding user 108) to communicate with other devices (i.e., resources) associated with network 100.

As shown, memory 112 is encoded with resource manager application 120-1 supporting generation, display, and implementation of functional operations of graphical user interface 150. Resource manager application 120-1 may be embodied as software code such as data and/or logic instructions (e.g., code stored in the memory or on another computer readable medium such as a disk) that supports processing functionality according to different embodiments of the invention as described herein. During operation, processor 113 accesses memory 112 via the interconnect 111 in order to launch, run, execute, interpret or otherwise perform the logic instructions of the resource manager application 120-1. Execution of resource manager application 120-1 produces processing functionality in resource manager process 120-2. In other words, the resource manager process 120-2 represents one or more portions of the resource manager application 120-1 (or the entire application 120-1) performing within or upon the processor 113 in the computerized device 110.

It should be noted that the resource manager 120 executed in computer system 110 is represented in FIG. 2 by either one or both of the resource manager application 120-1 and/or the resource manager process 120-2. For purposes of the discussion of the operation of embodiments of the invention, general reference will be made to the resource manager 120 as performing or supporting the various steps and functional operations to carry out the features of embodiments of the invention.

It should also be noted that embodiments of the invention include the resource manager application 120-1 itself (i.e., the un-executed or non-performing logic instructions and/or data). The resource manager application 120-1 may be stored on a computer readable medium such as a floppy disk, hard disk or in an optical medium. The resource manager application 120-1 may also be stored in a memory type system such as in firmware, read only memory (ROM), or, as in this example, as executable code within the memory system 112 (e.g., within Random Access Memory or RAM). In addition to these embodiments, it should also be noted that other embodiments of the invention include the execution of resource manager application 120-1 in processor 113 as the resource manager process 120-2. Thus, those skilled in the art will understand that the computer system 110 may include other processes and/or software and hardware components, such as an operating system that controls allocation and use of hardware resources.

Display 130 need not be coupled directly to computer system 100. For example, the resource manager 120 can be executed on a remotely accessible computerized device. In this instance, the graphical user interface 150 may be displayed locally to the user, while the resource manager process 120 is executed remotely.

In one embodiment, computer system 110 extracts information from database 125 using SQL (Structured Query Language) and stores the information locally in data structures for processing. For example, database 125 contains managed objects 210 (e.g., zone configuration data, resources connectivity information, etc. stored as database records, tables, data structures, etc.) associated with various hardware and software entities associated with network system 100. More details regarding use of managed objects 210 will be discussed in connection with the following figures.

To generate displayed information in graphical user interface 150, the host computer system 110 (e.g., the resource manager process 120-2) extracts information from database 125. For example, in one embodiment, the resource manager 120 receives an identity of at least one selected network resource (e.g., zone configuration data) associated with the storage area network. Based on selected zone configuration data, the resource manager 120 extracts information from managed objects 210 associated with the selected network resource as well as other related managed objects 210 from management database 125 and displays configuration settings of zones in network 100. In one embodiment, as will be explained later in this specification, the zone configuration data retrieved from database 125 does not match a current configuration setting of a respective zone in network 100. As mentioned, graphical user interface 150 generated by resource manager 120 provides user 108 the ability, among other things, to i) import current zone configuration data from a switch in network 100 and ii) export user generated zone configuration to configure a zone in network 100.

Figure 3:
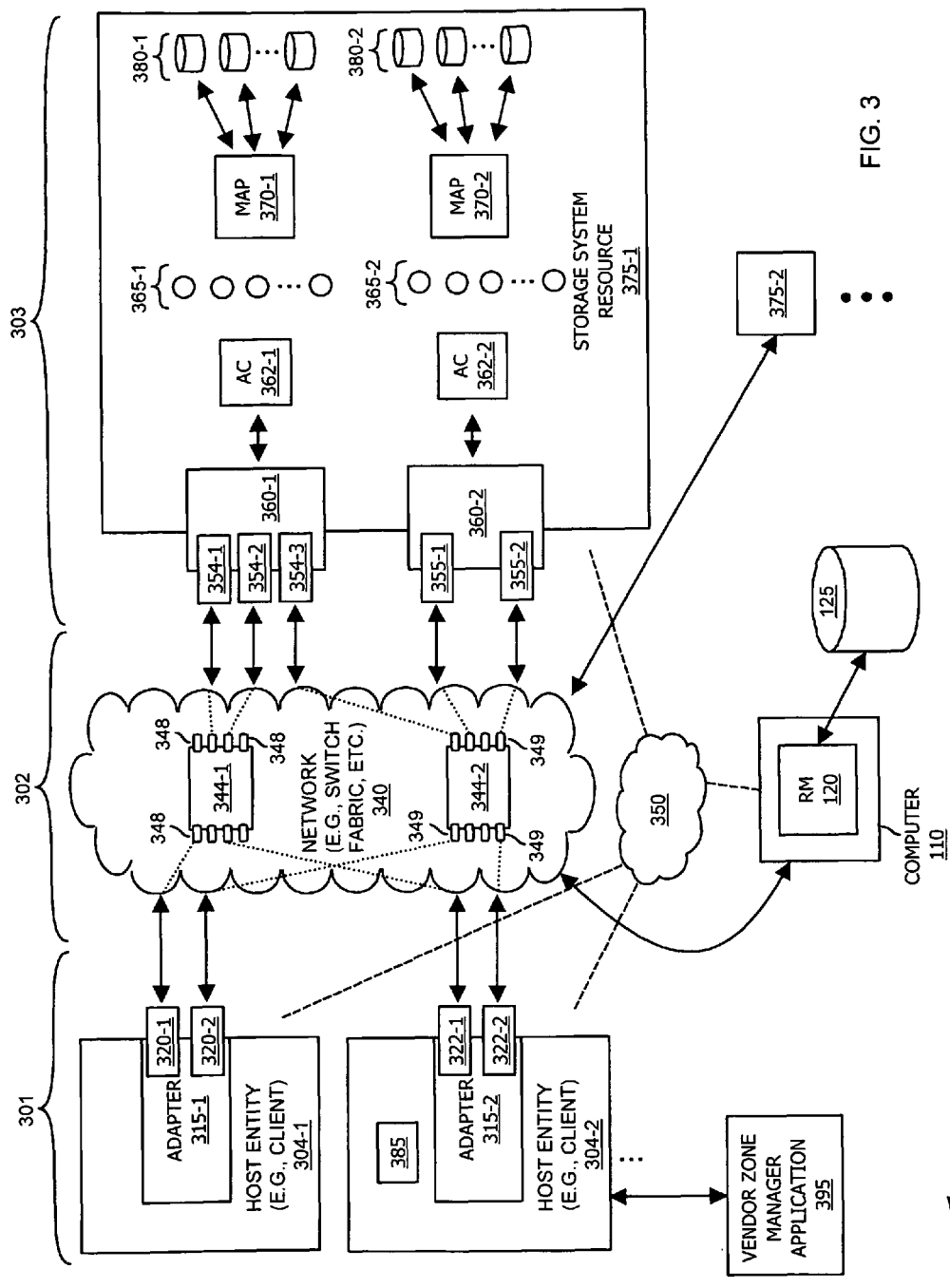
FIG. 3 is a block diagram illustrating a relationship between host resources, switch resources, and storage resources according to an embodiment of the invention.

FIG. 3 is a block diagram illustrating connectivity of network resources (e.g., host resources 301, switch resources 302, and storage resources 303) in a storage area network 300 according to an embodiment of the invention. As shown, storage area network 300 includes host entity 304-1, host entity 304-2, . . . (collectively, host entities 304), network 340 (e.g., a high speed fiber based switch fabric), network 350 (e.g., LAN, WAN, Internet, intranet, etc.), storage system resource 375-1, storage system resource 375-2, . . . (collectively, storage system resources 375), computer system 110, and database 125. Network 340 includes switch device 344-1, switch device 344-2 and corresponding switch ports 348 and 349. Host entity 304-1 includes adapter 315-1 and corresponding port 320-1 and port 320-2 to communicate over network 340. Host entity 304-2 includes adapter 315-2 and corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

In general, storage area network 300 enables host entities 304 (e.g., clients, host computers, etc.) to access data in storage system resources 375. As an example, host entity 304-1 couples to network 340 via adapter 315-1 and corresponding ports 320. Ports 320 couple to respective ports 348 and 349 on switch devices 344. In turn, ports 348 and 349 of switch devices 344 couple to ports 354 and 355 of corresponding storage system resources 375. Thus, switch devices 344 and corresponding ports 348 and 349 form at least part of a connection path (e.g., a zone) between host entities 304 and corresponding storage system resources 375.

Storage system resource 375-1 includes access controllers 362 to facilitate access to corresponding storage devices 365 (e.g., logical storage space). Storage devices 365 are configured as logical portions of one or more physical storage devices 380 (e.g., arrays of storage disks). Maps 370 provide a mapping of storage devices 365 (e.g., logical volumes) to corresponding physical storage devices 380 (e.g., storage disks).

Each host entity 304 is limited to accessing certain storage devices 365 in storage system resource 375-1 based at least in part on configuration settings of switch devices 344 of network 340. For example, in one embodiment, switch ports 348 and 349 of switches 344 are assigned to create a particular zone in network 300. In general, a zone defines a group of resources in the network providing a logical path i) through a switch resource 302 and ii) between a host resource 301 and a storage array resource 303. Thus, in some respects according to an embodiment of the invention, a zone is a definition of a logical path in the network 300. A user 108 at computer 110 modifies a configuration of zones in network 340 via communications through agent 385 in host entity 304-2. Thus, resource manager 120 in one respect is a zone manager application.

Note also that vendor zone manager application 395 (e.g., an application operated by a network manager other than user 108) can also generate zone configuration data to modify zones supported by switches 344. Consequently, both the vendor zone manager application 395 and the resource manager 120 can compete to configure zones in network 340. One purpose of implementing use of agent 385 in storage area network 300 is to monitor zone configuration settings in network 340 and notify resource manager 120 (or user 108) of the occurrence of changes to previously implemented zone configurations. This is discussed in more detail in the following text and related figures.

Figure 4:
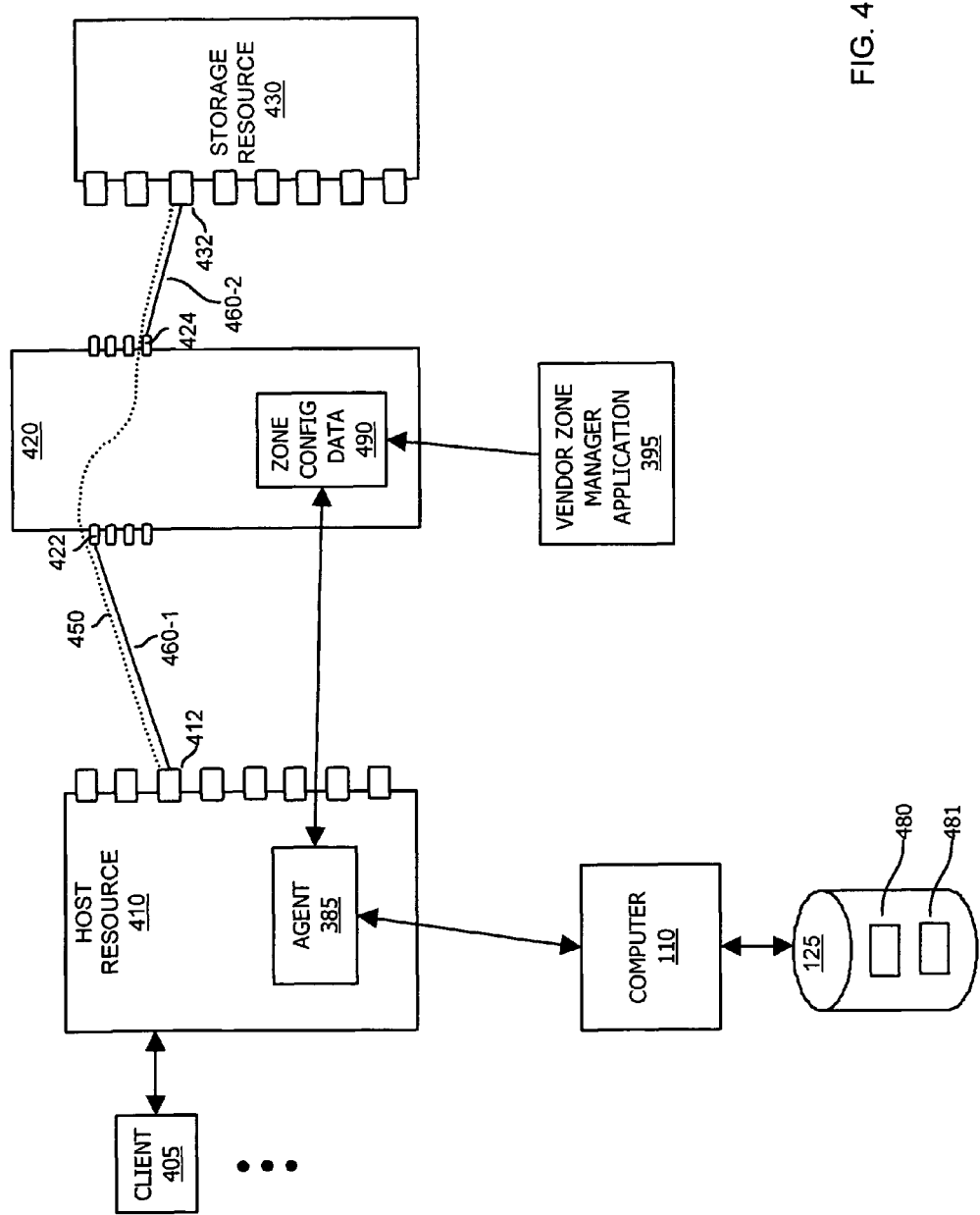
FIG. 4 is a diagram illustrating use of an agent (e.g., a software agent in a storage area network) to identify when a third party modifies configuration settings of a zone according to an embodiment of the invention.

FIG. 4 is a diagram illustrating use of an agent (e.g., a software agent in a storage area network) to identify when a third party (e.g., vendor zone manager application 395) modifies configuration settings of a zone according to an embodiment of the invention. As shown, zone 450 defines a logical path between host resource 410 and storage resource 430 through switch resource 420. More particularly, zone 450 comprises a logical path from port 412 of host resource 410 through link 460-1 (e.g., a fiber channel link) to port 422 of switch resource 420. Further, zone 450 comprises a logical path from port 424 of switch resource 420 through link 460-2 to port 432 of storage array resource 430.

Zone configuration data 490 in switch resource 420 defines attributes of zone 450. For example, among other things, zone configuration data 490 includes a listing of member ports (e.g., port 422 and port 424 of switch resource 420) associated with the zone 450. Thus, switch resource 420 configures zone 450 based on application of zone configuration data 490.

Via use of zone 450, client 405 can request retrieval of data through host resource 410. If client 405 has sufficient access rights, host resource 410 (e.g., a server of the data) retrieves the data on behalf of client 405 from storage resource 430 via communications supported by zone 450.

As previously discussed, both computer 110 and vendor zone manager application 395 (e.g., a vendor supplied zone application corresponding to the type of switch resource 420) both can generate and transmit zone configuration data 490 for configuring switch resource 420 with zones.

In one embodiment, the resource manager 120 receives a copy of the zone configuration data 490 used to configure zone 450 of the storage area network 300. Computer 110 stores the copy of zone configuration data 490 in database 125 (e.g., a data repository) or in cache of computer 110 as zone configuration data 480. The user modifies zone configuration data 480 to make change to configuration of zone 450. For example, the user modifies the zone configuration data 480 retrieved from database 125 to display zone attributes of zone 450 and produce user-generated zone configuration data, which is applied to change a configuration of zone 450. Prior to implementing the user modified zone configuration data, the agent 385 checks and provides notification whether the zone 450 is no longer configured according to zone configuration data 480. For example, a user associated with the vendor zone manager application 395 may have modified the zone configuration data 490 (since the copy of zone configuration data 480 to database 125) therefore changing the configuration of zone 450.

In response to receiving a command from user 108 to apply the user-generated zone configuration data to zone 450, the resource manager 120 transmits the user-generated zone configuration data to agent 385 that, in turn, utilizes the user generated zone configuration data to change a configuration of zone 450 in the storage area network 300.

Conflicts can occur when computer 110 attempts to modify zone configuration data 490 without accounting for changes by vendor zone manager application 395. For example, as briefly discussed, upon instantiation of zone 450 at time, t1, agent 385 forwards corresponding zone configuration data 490 for storage in database 125 as zone configuration data 480. Further, agent 385 generates an identifier 481 (e.g., a checksum, hash value, unique value, quasi unique value, etc.) based at least in part on contents of retrieved zone configuration data 490. Agent forwards the identifier 481 for storage in database 125. Agent 385 also retains (e.g., stores) the identifier 481 locally in corresponding memory of host resource 410 or other repository such as agent's cache. Consequently, agent 385 can identify changes to zone 450 by retrieving present zone configuration data 490 associated with zone 450, generating an identifier (e.g., a checksum) based on contents of the retrieved zone configuration data 490 from switch resource 420, and comparing the generated identifier to the previously stored identifier 481. If there is not a match based on the comparison, the agent 385 concludes that vendor zone manager application 395 or another source modified the zone configuration data 490 after time t1 and that user 108 at computer 110 needs to be notified and database 125 needs to be updated. In this circumstance when agent 385 detects a change, agent 385 stores the newly generated identifier and notifies computer 110 of the detected change to zone configuration data 490 and thus zone 450. In furtherance of the notification of the changes to computer 110, agent 385 forwards a copy of the current zone configuration data 490 and newly generated identifier to computer 110 for storage in database 125. This process of synchronizing zone configuration data 480 in database 125 and zone configuration data 490 in switch resource 420 ensures that computer 110 has knowledge of changes to the zone 450 in system configuration where vendor zone manager application 395 does not explicitly communicate with computer 110 of the changes. In other words, in this embodiment, vendor zone manager application 395 does not explicitly provide notification of zone configuration data 490 changes to computer 110. Instead, agent 385 monitors zone configuration data 490 for changes by vendor zone manager application 395 and notifies computer 110. Since agent 385 only stores an identifier (e.g., a 64 bit checksum value) of corresponding previously implemented zone configuration data 490 (instead of the zone configuration data 490 as well), agent 385 requires use of less memory storage resources for its cache. Note that in one embodiment, agent 385 stores identifiers for many zones in switch resource 420 and network 340.

Figure 5:
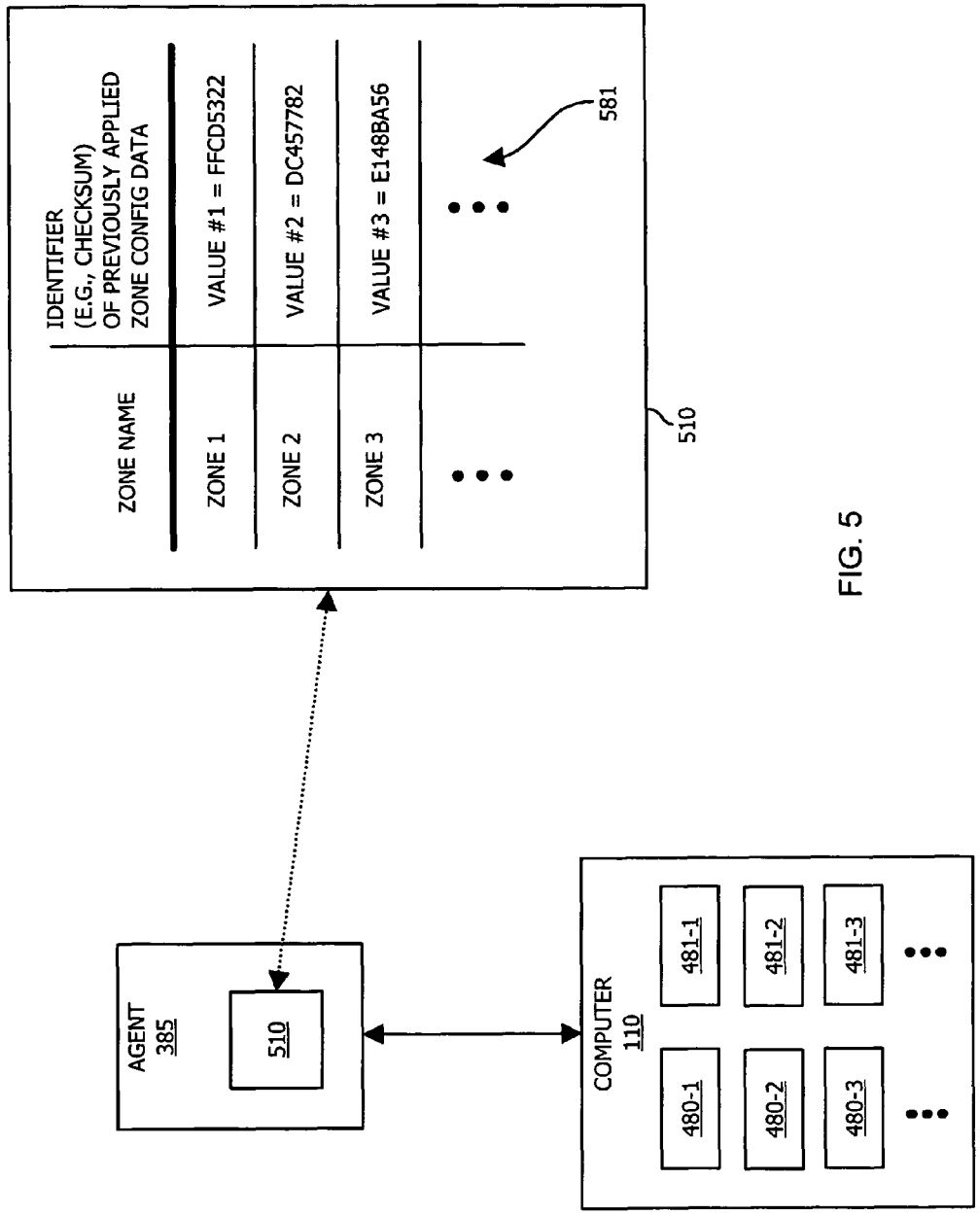
FIG. 5 is a diagram illustrating respective data stored by an agent and a network manager application according to an embodiment of the invention.

FIG. 5 is a diagram illustrating respective data stored by an agent 385 and computer 110 according to an embodiment of the invention. As shown, agent 385 stores identifiers 581 (e.g., a checksum) derived from previously applied zone configuration data to zones in the storage area network 300. As previously discussed, computer 110 (or database 125) stores respective copies of zone configuration data 480 (e.g., 480-1, 480-2, 480-3, ...) applied to respective zones of storage area network 300 as well as corresponding identifiers 481 (e.g., 481-1, 481-2, 481-3, ...), which are generated by agent 385 for each zone configuration data 480. Consequently, as agent 385 discovers newly applied zone configuration data in switch resource 420 for a given zone, agent 385 i) updates computer 110 and ii) updates its local cache 510 with identifiers 581. In one embodiment, agent occasionally or periodically retrieves zone configuration data associated with a given zone supported by switch resource 420 to identify whether an update to zone configuration data used by computer 110 is necessary.

In another embodiment, the agent 385 automatically checks for configuration changes to zone 450 when user 108 attempts to modify attributes of a zone. Typically, computer 110 assumes that zone 450 is configured according to a previously applied zone configuration data 490 stored as zone configuration data 480 in database 125. Thus, when user 108 desires to modify zone 450, the user 108 prompts computer 110 to retrieve the corresponding zone configuration data 480, which is a copy of previously applied zone configuration data. Via resource manager 120, the user 108 proceeds to modify the zone configuration data retrieved from database 125. To apply changes to the zone 450, user 108 sends a message to agent 385 of the desire to change attributes of zone 450. In turn, agent 385 performs a check to determine whether the vendor zone manager application 395 has modified the zone 450 since a time of generating and storing identifiers 481 and 581. If no change is detected based on the comparison method discussed above (e.g., checking whether an identifier generated based on present zone configuration data 490 matches an identifier stored in cache 510), agent 385 (on behalf of computer 110) configures zone 450 according to the user generated modification to the previously applied zone configuration data. If a change is detected based on the comparison method discussed above, agent 385 presents the user 108 with an option of i) exporting the user generated zone configuration data to configure zone 450 overwriting current configuration settings of the zone 450, or ii) importing zone configuration data 490 currently used to configure zone 450 and storing the zone configuration data 490 in database 125 as zone configuration data 480 along with an appropriate identifier 481 as generated by the agent 385. In one embodiment, agent 385 prompts the user 108 with an option of aborting application of user modified zone configuration data to the zone 450.

As discussed, embodiments of the invention include a technique of resolving an "out-of-sync" condition for zoning activation (application of modified zoning configuration) in a switch fabric of a storage area network 300. Note that further embodiments are applicable to discovery and/or rediscovery of currently active zoning in a fabric component such as switch resource 420. For example, when agent 385 discovers a new current zoning configuration (e.g., of a zone in a switch fabric), the agent 385 notifies the resource manager 120. The resource manager 120, in turn, notifies the user 108 of the change and provides an option of not automatically importing the current zoning configuration to the computer 110, but instead receiving an alert (from agent 385) that the current zoning configuration of zone 450 is different from a last seen/activated/imported configuration. In one embodiment, when agent 385 detects a change to zone configuration data in switch resource 420 (e.g., via periodic or random polling), the agent 385 in conjunction with resource manager 120 provides the user 108 with an option of reviewing any differences to the zone configuration data in switch resource 420 before finally making a decision whether to import new current zoning configuration data or not.

In one embodiment, the agent 385 provides an alert or alerts to the user 108 of a change to zone configuration data 490 not yet recorded in the database 125. When attempting to modify the zone 450 with user generated zone configuration data 490 and the agent 385 detects that zone configuration data in the switch resource 420 is out of sync with the respective zone configuration data 480 in database 125, agent notifies the user 108 (e.g., computer 110) of the out of sync condition and presents the user 108 with options of exporting and importing as discussed above. Thus, one aspect of the present embodiment involves the resource manager 120 receiving the indication that a source (e.g., the vendor zone manager application 395), other than that controlled by the user, modified a configuration of the given zone 450 in the switch resource without notifying the user 110 of a corresponding modification to the given zone 450. That is, the agent 385 detected and notified the user 108 of the change rather than the vendor zone manager application 395.

Figure 6:
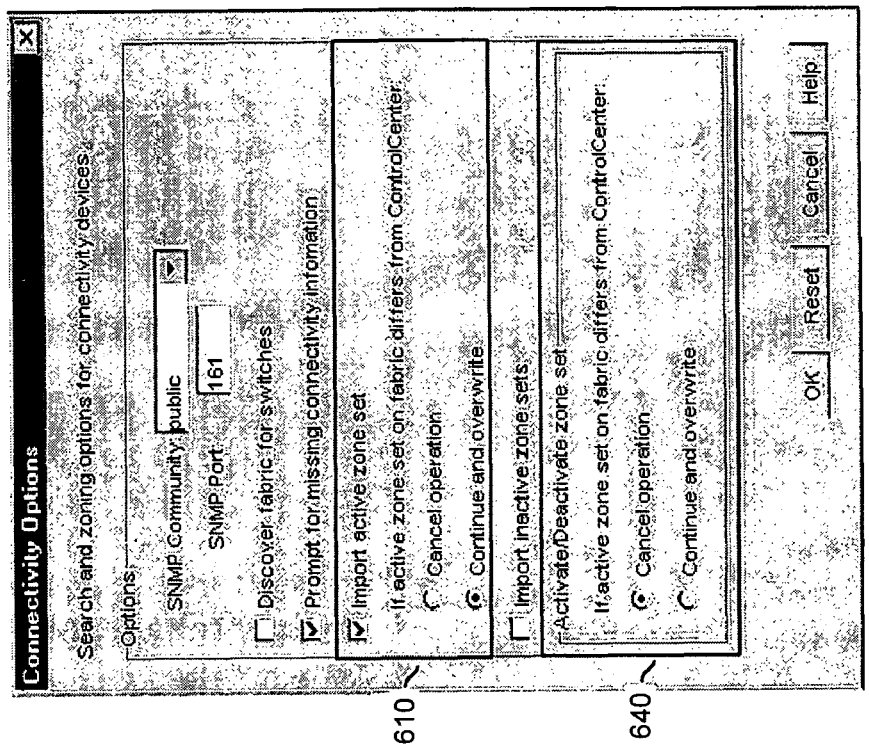
FIG. 6 is a screenshot of a graphical user interface enabling a user to import current configuration settings of a respective zone in a storage area network or export the network manager's current modifications to the zone regardless of the current configuration settings of the zone according to an embodiment of the invention.

FIG. 6 is a window 600 of a graphical user interface 150 generated by resource manager 120 enabling user 108 to import current configuration settings (e.g., zone configuration data 490) of respective zone 450 in a storage area network 300 or export the network manager's current modifications to the zone 450 regardless of the current configuration settings of the zone 450 according to an embodiment of the invention.

As shown, window 600 generated by resource manager 120 and presented to user 108 includes an option enabling the user 108 to import zone configuration data 490 from switch 420. For example, in response to receiving a notification of a configuration change to zone 450, the resource manager 120 presents a user 108 with an option 610 of importing current zone configuration data 490 associated with zone 450. Consequently, the resource manager 120 can receive a command from the user 108 through window 600 to import the current zone configuration data 490 associated with zone 450. As discussed, user 108 can choose to i) modify a copy of the current zone configuration data 490 and ii) selectively apply the modified copy of the current zone configuration data to zone 450.

As shown, window 600 generated by resource manager 120 and presented to user 108 includes an option 640 enabling the user 108 to export zone configuration data (e.g., a user modified version of zone configuration data 480) to configure zone 450 of switch 420. For example, in response to the agent identifying that the zone configuration data 490 and zone configuration data 480 do not match, window 600 presents user 108 with a "continue and overwrite" option enabling the user to export the user-generated zone configuration data to switch 420 and reconfigure zone 450 regardless of changes previously made by vendor zone manager application 395. In one embodiment, the resource manager 120 transmits (e.g., in a command message) highlighted options in window 600 to the agent 385 for implementing options selected by the user 108.

Functionality supported by computer system 110 and agent 385 according to embodiments of the invention will now be discussed via flowchart 700 in FIG. 7. Note that there will overlap with respect to concepts discussed above for FIGS. 1 through 6.

Figure 7:
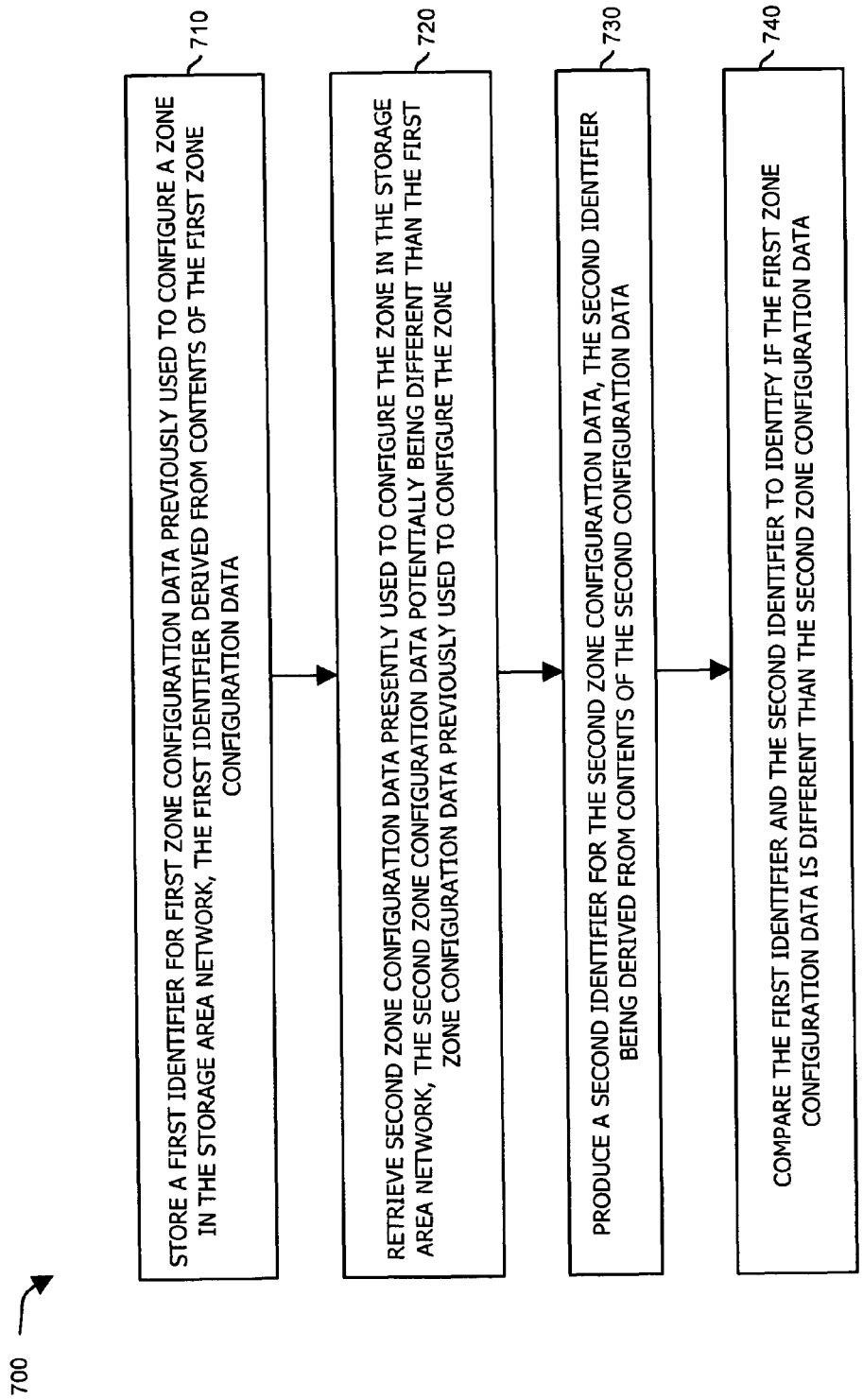
FIG. 7 is a flowchart illustrating a general technique for discovering a change to configuration settings of a zone according to an embodiment of the invention.

FIG. 7 is a flowchart 700 of processing steps performed by agent 385 according to an embodiment of the invention. In general, flowchart 700 illustrates how agent 385 (e.g., a remote software process in a host resource of a storage area network) identifies changes to zone configuration data 490 applied to zone 450. Note that the discussion of FIG. 7 will include occasional references to techniques and features discussed in the previous figures.

In step 710, the agent 385 stores a first identifier 581 (e.g., a checksum value previously generated and stored in cache 510) for first zone configuration data 480 previously used to configure a zone 450 in the storage area network 300. The agent 385 derives the first identifier 581 from contents of the first zone configuration data 480 at a snapshot in time when the zone configuration data 480 is applied to zone 450.

In step 720, the agent 385 retrieves second zone configuration data 490 presently used to configure the zone 450 in the storage area network 300. As discussed, the second zone configuration data 490 (e.g., current zone configuration data 490) is potentially different than the first zone configuration data 480 previously used to configure zone 450.

In step 730, based on retrieved contents of the second or current zone configuration data 490, the agent 385 then produces an identifier (such as a checksum) for the second zone configuration data 490.

In step 740, the agent 385 then compares the first identifier and the second identifier to determine whether the previously applied zone configuration data 480 is different than the currently applied zone configuration data 490. If the first identifier and second identifier match, the agent 395 notifies the user 108 (through resource manager 120 and graphical user interface 150) that there has been no configuration change to the zone 450 since applying the first zone configuration data 480 to the zone 450. If the identifiers do not match, the agent 385 notifies the user 108 that there has been a configuration change to zone 450 since initially applying the first zone configuration data 480 to the zone 450 at an earlier time.

In further embodiments as discussed, the agent 385 then presents the user 108 with options enabling the user to i) overwrite the currently applied zone configuration settings with the user generated modifications or ii) update the user's database 125 with configuration settings currently applied to the zone 450. These were discussed in relation to FIG. 6 and again are discussed in relation to FIG. 8.

Figure 8:
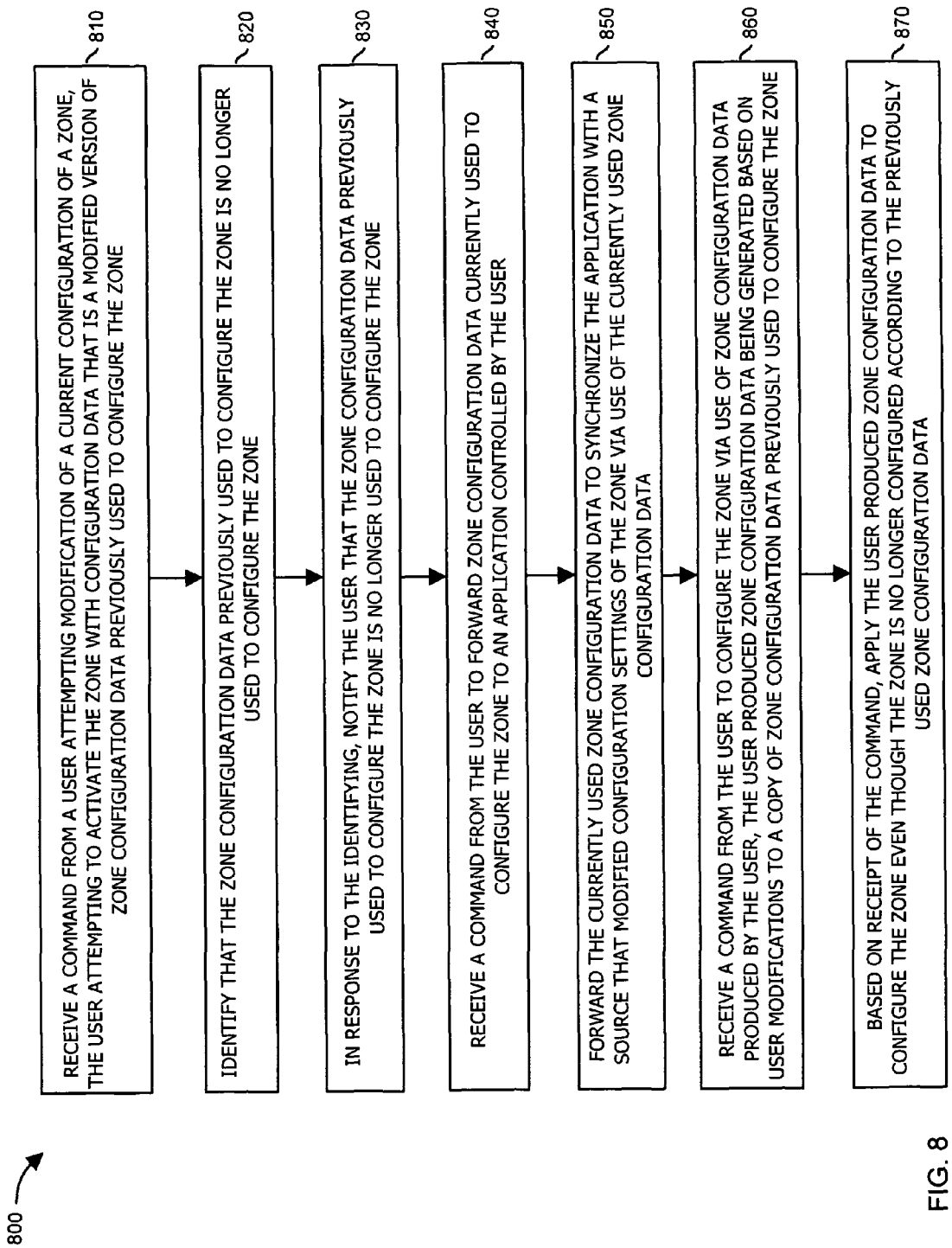
FIG. 8 is a flowchart illustrating a technique of enabling a user to import and export zone configuration settings of a zone according to an embodiment of the invention.

FIG. 8 is a flowchart illustrating a technique of enabling a user to import and export zone configuration settings of a zone according to an embodiment of the invention.

In step 810, agent 385 receives a command from a user 108 (e.g., a remotely located user) attempting modification of a current configuration of zone 450. Based on the command, the user attempts to activate the zone 450 with configuration data that is a modified version of zone configuration data previously used to configure the zone 450 as discussed above.

In step 820, the agent 385 identifies (based on use of identifiers as previously discussed) that the zone configuration data 480 previously used to configure the zone 450 is no longer presently used to configure the zone 450.

In step 830, in response to the identifying in step 820, the agent 385 notifies the user 108 that the zone configuration data 480 previously used to configure the zone is no longer used to configure the zone 450.

In further embodiments, as in step 840, the agent 385 receives a command from the user 108 to forward zone configuration data 490 currently used to configure the zone 450 to an application controlled by the user 108.

In step 850, the agent 385 forwards the currently used zone configuration data 490 to synchronize the user application with a source that modified configuration settings of the zone via use of the currently used zone configuration data. Consequently, agent 385 facilitates importing zone configuration data to the user application (e.g., resource manager 120) so that the user 108 is synchronized with respect to the current configuration of the zone 450.

In yet further embodiments, as in step 860, the agent 385 receives a command from the user 108 to configure the zone 450 via use of zone configuration data produced by the user 108. The user-produced zone configuration data is generated based on user modifications to a copy of zone configuration data 480 previously used to configure the zone 450. In one embodiment, resource manager 120 displays a physical layout of the zone and related resources so that a user can easily modify which resources are to be included in a newly configured zone.

In step 870, based on receipt of the command, the agent 385 applies the user produced zone configuration data received from computer 110 to configure the zone 450 even though the zone 450 is no longer configured according to the previously applied zone configuration data 480. In other words, vendor zone manager application 395 or other source modified the zone configuration data 490 since the stored zone configuration data 480 was applied to configure zone 450. Consequently, in one embodiment, the agent 385 facilitates exporting zone configuration data from the user 108 to the switch resource 420 so that the user can be synchronized or alerted with respect to the current configuration of the zone 450.

Figure 9:
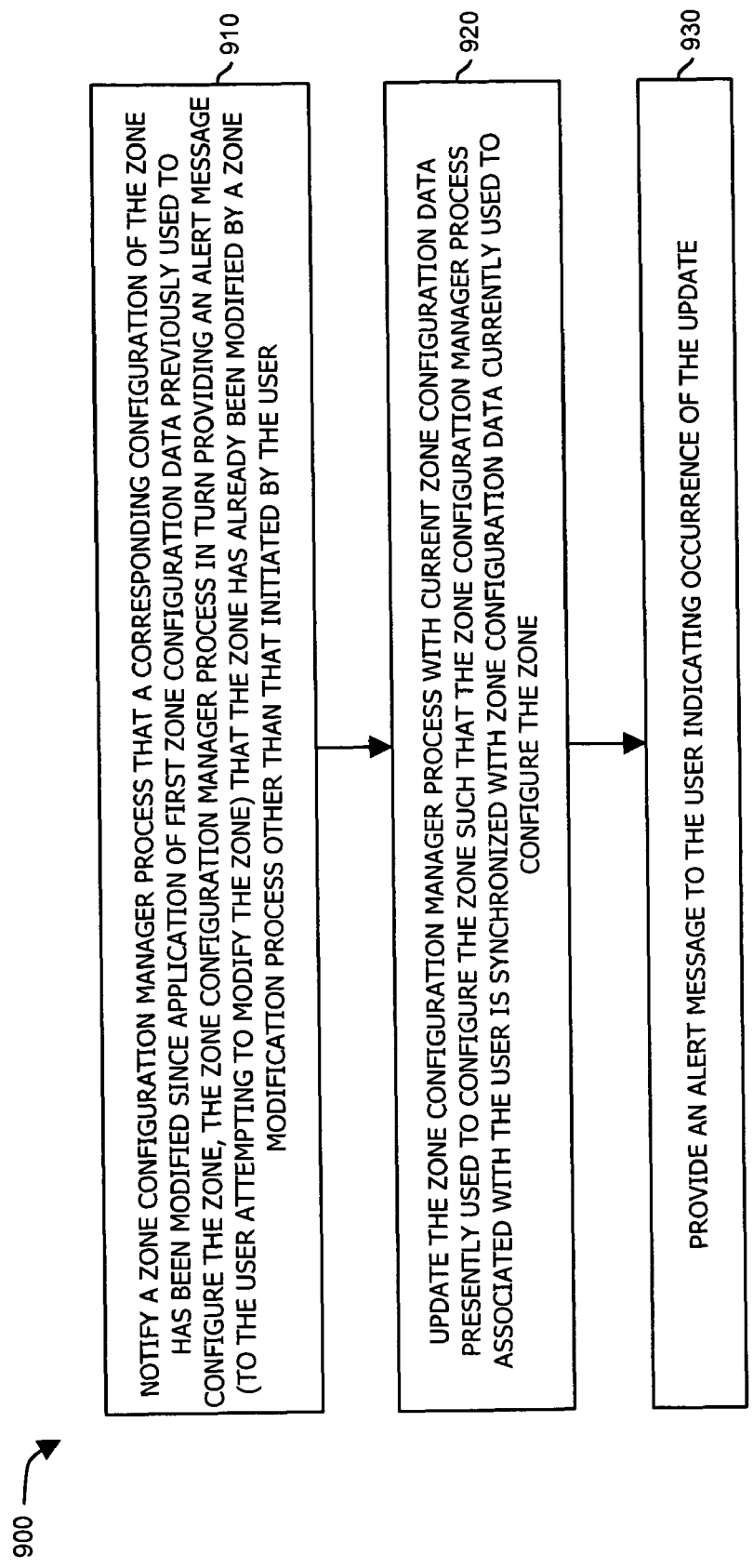
FIG. 9 is a flowchart illustrating a technique of updating and alerting a user of new zone configuration settings in a zone according to an embodiment of the invention.

FIG. 9 is a flowchart 900 illustrating a technique of updating and alerting a user of new zone configuration settings in a zone according to an embodiment of the invention. For example, flowchart 900 illustrates how agent 385 supports generation of alerts to notify a user 108 of a change to zone configuration.

In step 910, the agent 385 notifies resource manager 120 (such as a zone configuration manager process utilized by the user 108) that a corresponding configuration of the zone 450 has been modified since application of first zone configuration data 480 previously used to configure the zone 450. The resource manager 120 associated with the user 108, in turn, provides an alert message to the user 108 attempting to modify the zone 450 that the zone 450 has already been modified since application of the first zone configuration data by an independent process (e.g., vendor zone manager application 395) other than that initiated by the user 108. Thus, the user 108, prior to the notification, is not yet aware of applied changes by vendor zone manager application 395.

In step 920, the agent 395 then updates the resource manager 120 (and related database 125) with current zone configuration data 490 presently used to configure the zone 450 such that the resource manager 120 associated with the user 108 is synchronized with zone configuration settings of switch resource 420.

In step 930, the agent 395 provides an alert message to the user 108 to indicate the occurrence of the update. For example, the resource manager 120 displays the alert message to notify the user 108 of the condition that zone configurations of the switch resource 420 have changed since a previous setting. Consequently, an agent 395 in the storage area network 300 can monitor zone configuration data 490 for changes and notify a user 108 when other sources such as vendor zone manager application 395 modify zone configurations of the storage area network 300.

FIG. 10 is a flowchart illustrating techniques of notifying a user of changes to zone configuration settings as well as merging of zone configuration settings according to embodiments of the invention. For example, certain embodiments of the invention are directed towards identifying differences between previously applied zone configuration data 480 and currently applied zone configuration data 490 to zone 450.

In step 1005, the agent 395 (or other employed process) identifies that zone configuration data 490 currently applied to the zone 450 does not match zone configuration data 480 previously applied to the zone 450.

In step 1010, the agent 395 generates a list or file of differences between zone configuration data 480 previously applied to the zone 450 and zone configuration data 490 currently applied to the zone 450. For example, the agent 395 retrieves the zone configuration data 480 from computer 110 and zone configuration data 490 from switch resource 420 and generates a list of differences such as which member ports have been added to or deleted from the originally applied zone configuration data 480 to produce zone configuration data 490.

In step 1015, the agent 395 then notifies resource manager 120 of the differences so that the user 108 can identify changes to the zone 450 occurring since application of the previously applied zone configuration data. In other words, the user 108 can identify what changes have been made by vendor zone manager application 395 after applying zone configuration data 480 to zone 450 and notify user 108 accordingly. Thus, the resource manager 120 can update its database 125 based on the differences so that the user application has a copy of the presently applied zone configuration data 490 used to configure zone 450. Also, in one embodiment, the resource manager 120 graphically displays the differences for viewing so that user 108 can identify changes made to the zone 450 by another source such as vendor zone management application 395.

Embodiments of the invention are further directed towards merging user-generated zone configuration data with zone configuration data 490 currently used to configure zone 450. For example, when the agent 385 (or other employed process) identifies that zone configuration data currently applied to the zone does not match zone configuration data previously applied to the zone, the user can direct the agent to merge the user generated zone configuration data with presently applied zone configuration data 490 of a respective zone.

In step 1020, the agent 385 receives a command from the user 108 to produce merged zone configuration data based on not yet implemented user generated zone configuration data and zone configuration data 490 currently applied to the zone 450. Based on receipt of the command, the agent 385 then identifies whether there are differences between previously applied zone configuration data 480 and currently applied zone configuration data 490 of the zone 450. If not, the agent can simply apply the new user generated zone configuration data to configure the zone 450. If so, in step 1025, the agent 385 merges the user generated zone configuration data with zone configuration data 490 currently applied to the zone 450.

In one embodiment, the agent 385 first identifies whether the user generated zone configuration data and currently applied zone configuration data 490 are "mergeable" based on a set of merge rules before applying the merged set of zone configuration data. As an example, merge rules may allow merging of zone configuration data as long as both sources (e.g., user 108 and vendor zone manager application 395) produce zone configuration data that is consistent with each other. For example, suppose zone configuration data 480 includes a zone definition including port members 1, 3, and 4 of switch resource 420. If vendor zone manager application 395 modifies the applied zone configuration data 490 to include member ports 1, 3, 4, and 5 (i.e., vendor zone manager application adds port member 5) while user 108 generates zone configuration data to include member ports 1, 3, 4, and 7, the zone configuration data is "mergeable." The merged zone configuration data would include port members 1, 3, 4, 5, and 7.

On the other hand, suppose again that zone configuration data 480 includes a zone definition including port members 1, 3, and 4 of switch resource 420. If vendor zone manager application 395 modifies the applied zone configuration data 490 to include only member ports 1 and 4 (i.e., vendor zone manager application 395 deletes port member 3) while user 108 generates zone configuration data to include member ports 1 and 3, the zone configuration data is not "mergeable." In this instance, agent 385 notifies the user 108 that the user-generated will not be applied to zone 450 due to a conflict.

As discussed, techniques of the invention are well suited for use in applications in which multiple network managers modify configuration settings of the same zone in a storage area network. However, it should be noted that embodiments of the invention are not limited to use in such applications and thus embodiments of the invention are well suited for other applications as well. For example, techniques described herein can be used to synchronize other types of remotely located data in which a process monitors a change data.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A method for synchronizing zone configuration data in a storage area network, the method comprising:

storing a first identifier for first zone configuration data previously used to configure a zone in the storage area network, the first identifier derived from contents of the first zone configuration data;

retrieving second zone configuration data presently used to configure the zone in the storage area network, the second zone configuration data potentially being different than the first zone configuration data previously used to configure the zone;

producing a second identifier for the second zone configuration data, the second identifier being derived from contents of the second zone configuration data; and comparing the first identifier and the second identifier to identify if the first zone configuration data is different than the second zone configuration data.

2. A method as in claim 1 further comprising:

receiving a command from a user attempting modification of a current configuration of the zone via application of user generated zone configuration data, the user generated zone configuration data being a user modified version of the first zone configuration data;

wherein comparing the first identifier and the second identifier further includes identifying that the second zone configuration data of the zone does not match the first zone configuration data; and in response to the identifying, notifying the user that the zone is no longer configured according to the first zone configuration data.

3. A method as in claim 2 further comprising:

receiving a command from the user to configure the zone via use of the user generated zone configuration data; and based on receipt of the command, applying the user generated zone configuration data to configure the zone even though the zone is no longer configured according to the first zone configuration data.

4. A method as in claim 1, wherein steps of retrieving and comparing are performed in response to a request by a zone configuration manager process, which is controlled by a user, to modify configuration settings of the zone; and notifying the zone configuration manager process that a corresponding configuration of the zone has been modified since application of the first zone configuration data to configure the zone, the zone configuration manager process in turn providing an alert message to the user attempting to modify the zone that the zone has already been modified by a zone modification process other than that initiated by the user.

5. A method as in claim 1, wherein comparing the first identifier and the second identifier further involves identifying that the second zone configuration data currently applied to the zone does not match the first zone configuration data previously applied to the zone, the method further comprising:

generating a list of differences between the first zone configuration data and the second zone configuration data; and notifying an application controlled by the user of the differences so that the user can identify changes to the zone following configuration of the zone according to the first zone configuration data.

6. A method as in claim 1, wherein comparing the first identifier and the second identifier results in identifying that the zone is presently not configured according to the first zone configuration data, the method further comprising:

receiving a command from the user to produce merged zone configuration data based on third zone configuration data provided by the user and the second zone configuration data; and configuring the zone with the merged zone configuration data.

7. A method as in claim 1 further comprising:

prior to the storing, applying a processing function to the contents of the first zone configuration data to derive the first identifier, the first identifier being a first unique value, the processing function deriving different unique values for different zone configuration data;

wherein producing the second identifier includes applying the processing function to the contents of the second zone configuration data to derive the second identifier, the second identifier being a second unique value;

wherein storing the first identifier includes maintaining an indication that the zone has been initially configured with the contents of the first zone configuration data; and wherein comparing includes detecting that the first identifier is not equal to the second identifier indicating that the zone is configured with the second zone configuration data, the second zone configuration data being different than the first zone configuration data.

8. A method as in claim 1 further comprising:

identifying a difference between the first zone configuration data and the second zone configuration data; and applying a set of merging rules to detect whether the first zone configuration data and the second zone configuration data can be merged into a single set of zone configuration data for configuring the zone;

wherein applying the set of merge rules includes:

identifying that contents of the first zone configuration data includes a port of a respective switch that is not specified by the contents of the second zone configuration data;

producing merged zone configuration data based on combining of the contents of the first zone configuration data with the contents of the second zone configuration data, the merged zone configuration data including the port as a member; and reconfiguring the zone to include the port of the respective switch as specified by the merged zone configuration data.

9. A method as in claim 8 further comprising:

identifying a difference between the first zone configuration data and the second zone configuration data; and applying a set of merging rules to detect whether the first zone configuration data and the second zone configuration data can be merged into a single set of zone configuration data for configuring the zone;

wherein applying the set of merge rules includes:

identifying that contents of the first zone configuration data is consistent with contents of the second zone configuration data;

producing merged zone configuration data based on combining of the contents of the first zone configuration data with the contents of the second zone configuration data; and reconfiguring the zone based on the merged zone configuration data.

10. A method as in claim 1 further comprising:

configuring the zone with the first zone configuration data prior to retrieving the second zone configuration data; and wherein retrieving the second zone configuration data includes communicating with a switch resource of the storage area network that implements the zone, the switch resource implementing the zone to support a logical path between a host resource and a storage resource of the storage area network.

11. A method as in claim 1, wherein the first zone configuration data is different than the second zone configuration data, the method further comprising:
   based on the comparing, detecting that the first identifier is not equal to the second identifier;
   providing notification to a user that the zone has been configured by a source other than the user; and
   providing notification to the user that the zone has been reconfigured with the second zone configuration data subsequent to a time of the zone being configured with the first zone configuration data.

12. A method as in claim 11, wherein the first identifier is a first checksum value derived from the contents of the first zone configuration data, and wherein the second identifier is a second checksum value derived from the contents of the second zone configuration data, the method further comprising:
   providing the user with an option of reviewing differences between the first zone configuration data and the second zone configuration data.

13. A method as in claim 12 further comprising:
   based on input from the user, updating a repository of configuration information associated with the user to include the second zone configuration data to indicate that the zone is currently configured in accordance with the second zone configuration data.

14. A method as in claim 13, wherein multiple different sources in a storage area network environment compete to modify the zone, the multiple different sources including the user and the source other than the user.

15. A method as in claim 1, wherein the first zone configuration data is identical to the second zone configuration data, the method further comprising:
   based on the comparing, detecting that the first identifier is equal to the second identifier;
   providing notification to a user that there has been no configuration changes to the zone since configuring of the zone with the first zone configuration data; and
   utilizing new zone configuration data provided by the user to configure the zone.

16. A method as in claim 1 further comprising:
   applying a processing function to the contents of the first zone configuration data to derive the first identifier, the first identifier being a first unique value;
   wherein storing the first identifier includes storing an indication that the zone has been initially configured with the first zone configuration data;
   wherein producing the second identifier includes applying the processing function to contents of the second zone configuration data to derive the second identifier, the second identifier being a second unique value; and
   wherein comparing includes detecting that the first identifier is not equal to the second identifier indicating that configuration of the zone has changed since configuring the zone with the first zone configuration data.

17. A method as in claim 1 further comprising:
   in response to detecting that the first identifier is different than the second identifier, providing notification that a configuration of the zone has changed since configuration of the zone with the first zone configuration data.

18. A method as in claim 17 further comprising:
   applying a processing function to the contents of the first zone configuration data to derive the first identifier, the first identifier being a first unique checksum value; and
   wherein producing the second identifier includes applying the processing function to the contents of the second zone configuration data to derive the second identifier, the second identifier being a second unique checksum value.

19. A computer system associated with a storage area network, the computer system comprising:
   a processor;
   a memory unit that stores instructions associated with an application executed by the processor; and
   an interconnect coupling the processor and the memory unit, enabling the computer system to execute the application and perform operations of:
      storing a first identifier for first zone configuration data previously used to configure a zone in the storage area network, the first identifier derived from contents of the first zone configuration data;
      retrieving second zone configuration data presently used to configure the zone in the storage area network, the second zone configuration data potentially being different than the first zone configuration data previously used to configure the zone;
      producing a second identifier for the second zone configuration data, the second identifier being derived from contents of the second zone configuration data; and
      comparing the first identifier and the second identifier to identify if the first zone configuration data is different than the second zone configuration data.

20. A computer system as in claim 19, wherein the first zone configuration data is different than the second zone configuration data, the first identifier being a first checksum value derived from the contents of the first zone configuration data, and the second identifier being a second checksum value derived from the contents of the second zone configuration data, the computer system further performing operations of:
   based on the comparing, detecting that the first identifier is not equal to the second identifier;
   providing notification to a user that the zone has been configured by a source other than the user;
   providing notification to the user that the zone has been reconfigured with the second zone configuration data subsequent to a time of the zone being configured with the first zone configuration data;
   providing the user with an option of reviewing differences between the first zone configuration data and the second zone configuration data;
   based on input from the user, updating a repository of configuration information associated with the user to include the second zone configuration data to indicate that the zone is currently configured in accordance with the second zone configuration data; and
   wherein multiple different sources in a storage area network environment compete to modify the zone, the multiple different sources including the user and the source other than the user.

21. A computer system associated with a storage area network, the computer system providing:
   means for storing a first identifier for first zone configuration data previously used to configure a zone in the storage area network, the first identifier derived from contents of the first zone configuration data;
   means for retrieving second zone configuration data presently used to configure the zone in the storage area network, the second zone configuration data potentially being different than the first zone configuration data previously used to configure the zone;

means for producing a second identifier for the second zone configuration data, the second identifier being derived from contents of the second configuration data; and means for comparing the first identifier and the second identifier to identify if the first zone configuration data is different than the second zone configuration data.

22. A computer program product including a hardware computer-readable storage medium having instructions stored thereon for processing data information, such that the instructions, when carried out by a processing device, enable the processing device to perform the steps of:

storing a first identifier for first zone configuration data previously used to configure a zone in the storage area network, the first identifier derived from contents of the first zone configuration data;

retrieving second zone configuration data presently used to configure the zone in the storage area network, the second zone configuration data potentially being different than the first zone configuration data previously used to configure the zone;

producing a second identifier for the second zone configuration data, the second identifier being derived from contents of the second zone configuration data; and comparing the first identifier and the second identifier to identify if the first zone configuration data is different than the second zone configuration data.

* * * * *